United States Patent [19]

Specker et al.

[11] 4,161,874
[45] Jul. 24, 1979

[54] HEAD AND NECK IMPACT MEASUREMENT SYSTEM

[75] Inventors: Lawrence J. Specker, Dayton, Ohio; Aubin M. Higgins, Earlington, Ky.; James W. Brinkley, Kettering, Ohio

[73] Assignee: The United States of America as represented by the Secretary of the Air Force, Washington, D.C.

[21] Appl. No.: 932,071

[22] Filed: Aug. 8, 1978

[51] Int. Cl.² .................... G01M 7/00; G01P 15/00
[52] U.S. Cl. ................................. 73/12; 73/432 SD
[58] Field of Search .................... 73/12, 432 SD, 663

[56] References Cited
U.S. PATENT DOCUMENTS 3,841,163  10/1974  Daniel ........................ 73/432 SD

*Primary Examiner*—James J. Gill
*Attorney, Agent, or Firm*—Joseph E. Rusz; Richard J. Killoren

[57] ABSTRACT

A system for measuring head and neck impact forces, having a movable plate member with an anthropometric dummy head and neck member secured to the plate member. Three force measuring cells are positioned in a horizontal plane and are connected between the movable plate member and three column members. Three vertical force measuring cells are positioned between a support plate and the movable plate member. High frequency response triaxial accelerometers are mounted at the center of gravity of the dummy head and neck member and on the movable plate member adjacent the attachmment of the dummy head and neck member.

2 Claims, 4 Drawing Figures

HEAD AND NECK IMPACT MEASUREMENT SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to a system for measuring mechanical head and neck impact forces.

In the structural tests of aircraft canopies, birds are impacted on the canopies simulating bird-aircraft midair collisions. These collisions can result in an impact of the canopy with pilot's helmet. In previous birdstrike tests entire anthropometric dummies were used in a full size cockpit and accelerations only were measured to assist in the evaluation of injury potential to the crew members.

BRIEF SUMMARY OF THE INVENTION

According to this invention a device is provided for measuring head acceleration and impact forces for the determination of moments reacted through the base of the neck. The impact forces are measured by an array of six force cells positioned in the three axes. The head acceleration is measured by the use of a high frequency response triaxial accelerometer mounted at the CG of a 95th percentile anthropometric dummy head and neck member. A second triaxial accelerometer is mounted centrally in the device to further measure motion of the head to indicate acceleration inputs from surrounding structure.

IN THE DRAWINGS

DETAILED DESCRIPTION OF THE INVENTION

Figure 1:
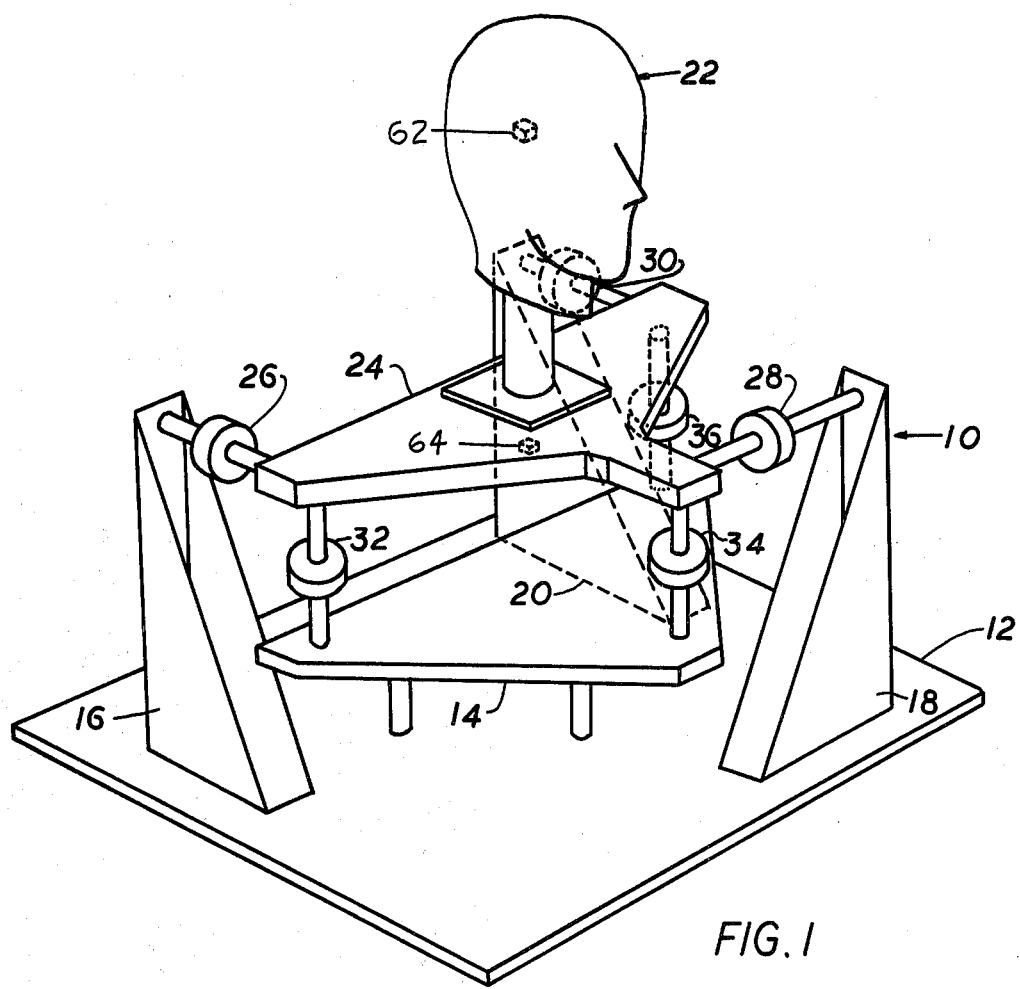
FIG. 1 is an isometric view of a head and neck impact measurement system according to the invention.

Reference is now made to FIG. 1 of the drawing which shows a head impact measuring system 10 secured to a platform member 12. A support plate 14 and three columns 16, 18 and 20 are secured to platform member 12 with bolts, or other known means, not shown. A 95th percentile anthropometric dummy head-neck member 22 is secured to a movable plate 24. The head and neck member used was an Alderson VIP95 head-neck device. Three horizontal load cell link assemblies 26, 28 and 30 are connected between the columns 16, 18 and 20 and the movable mounting plate 24. Three vertical load cell link assemblies 32, 34 and 36 are connected between the support plate 14 and the movable mounting plate 24.

The load cell link assemblies include a load cell 40 secured to a load cell mounting plate 42 by means of screws 44. The load cells used in the device constructed were FL2.5u2SPKT load cells made by Strainsert Co. A double threaded stud member 46 has one end threaded into the load cell and the other end threaded into rod-end-with-self-aligning bearing member 48, a second double threaded stud member 50 has one end threaded into load cell mounting plate 42 and the other end threaded into rod-end-with-self-aligning bearing member 54. The rod ends with self aligning bearings used in the device constructed were CXF-6-B2 rod ends with self aligning bearings made by Bearings, Inc.

Each of the rod-end-with-self-aligning bearing members 54 is secured to an adjustable clevis member 56. The adjustable clevis members, for the load cell link assemblies 26, 28 and 30, are secured to the columns 16, 18 and 20. The adjustable clevis members for the load cell link assemblies 32, 34 and 36 are secured to the support plate 14.

Each of the rod-end-with-self-aligning bearing members 48 is secured to lugs 55 on movable mounting plate 24 or lugs 57 on mounting bracket 58.

A longitudinal line through the load cell link assemblies, that is through the center of members 56, 54, 50, 42, 40, 46, 48 and 58 will hereinafter be referred to as the active axis of the load cells. The active axis of the load cells in the load cell link assemblies 26 and 32 intersect at a point $P_1$ in the movable mounting plate 24. The active axis of the load cells in the load cell link assemblies 28 and 34 intersect at a point $P_3$ in the movable mounting plate 24. The active axis of the load cells in the load cell link assemblies 30 and 36 intersect at a point $P_2$ in the movable mounting plate 24. The active axis of the load in the load cell link assembly 28 is parallel to a line 61 connecting points $P_1$ and $P_2$.

In the device constructed a first triaxial accelerometer 62 was mounted at the center of gravity of the head and neck member to measure head accelerations. A second accelerometer 64 was mounted below movable plate 24 in vertical alignment with accelerometer 62 to indicate acceleration inputs from surrounding structure. The triaxial accelerometers used in the device constructed were EGA3-125I-250P made by Entran Devices Inc.

Figure 5:
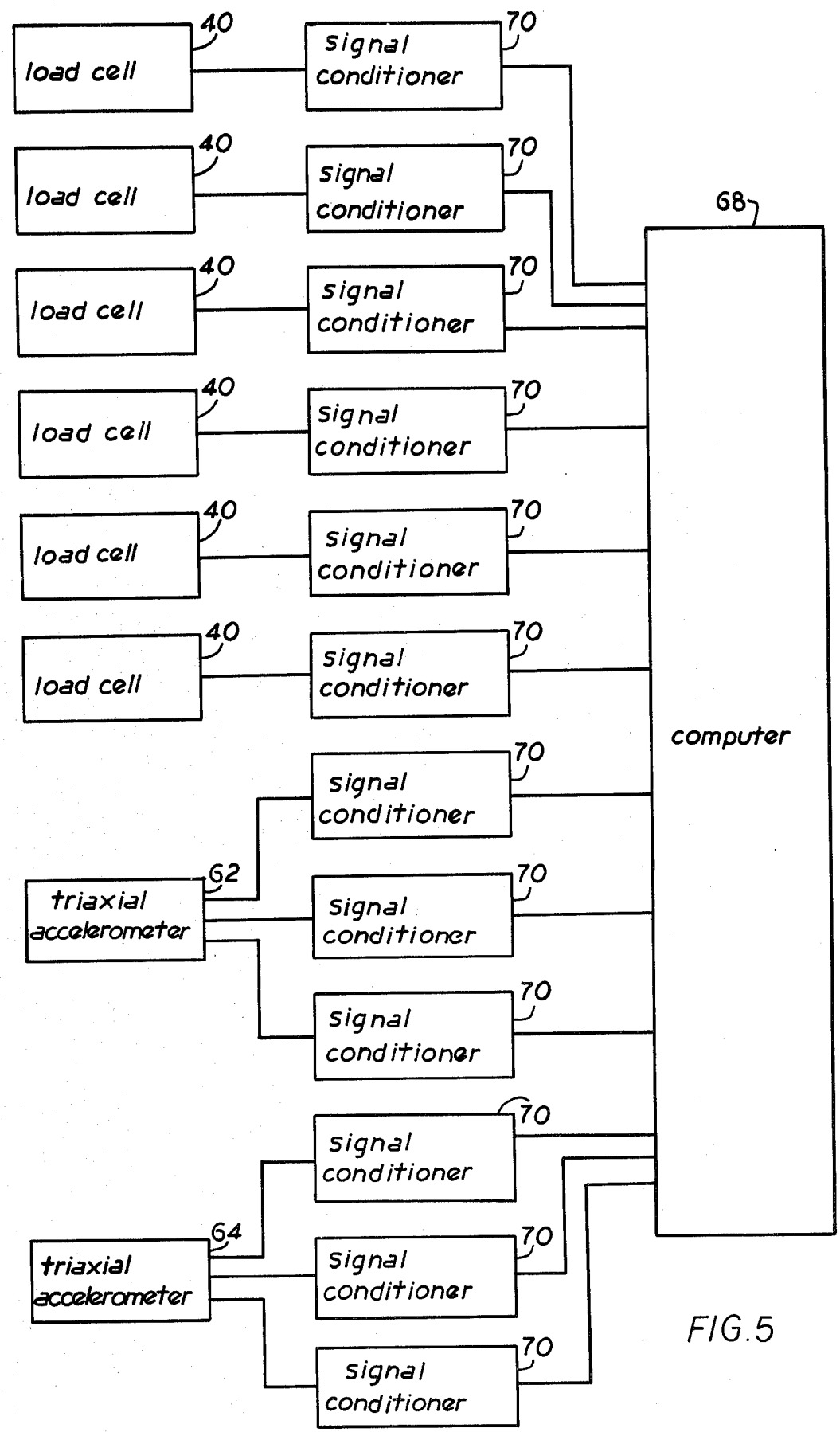
FIG. 5 shows a schematic block diagram showing a data collection and processing system for the device of FIG. 1.

The outputs of load cells and triaxial accelerometers are processed in a conventional data collection and processing system. Such a system is shown generally in the block diagram of FIG. 5 wherein the load cell and triaxial accelerometer outputs are connected to computer 68 through the signal conditioning circuits 70. The particular data collection and processing system used would be determined by the particular use of the device and forms no part of this invention. In the apparatus constructed the device was calibrated by applying known accelerations and forces to the head and neck member and to the mounting plate.

Figure 4:
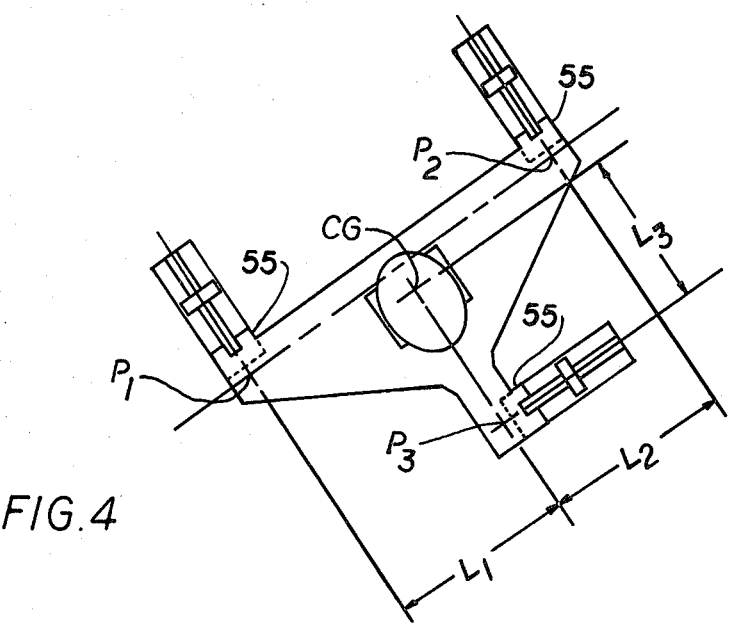
FIG. 4 is a partially schematic top view of the device of FIG. 1.
Figure 2:
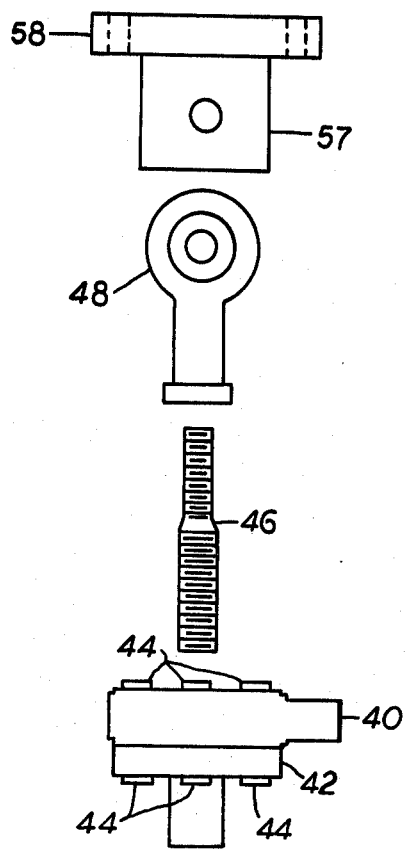
FIG. 2 is a partially expanded view of one of the load cell link assemblies for the device of FIG. 1.
Figure 3:
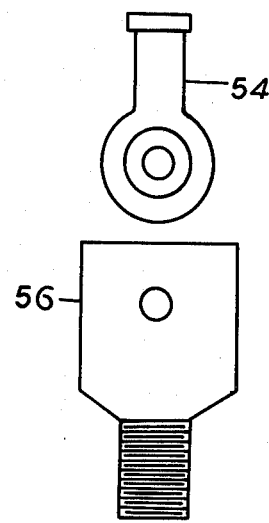
FIG. 3 is a side view of the clevis attachment member for the device of FIG. 2, with the rod end with self-aligning bearing in place.
Figure 3:
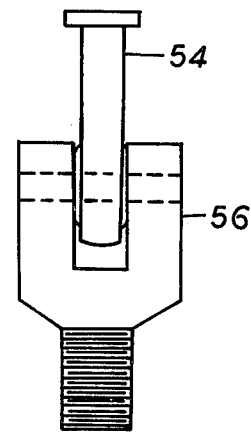

In the operation of the device the head and neck impact measuring system 10 is mounted within a conventional canopy, for example, as used on an F-16 aircraft, mounted on a table top test fixture, not shown. A helmet, not shown, is secured to the head of the dummy head-neck member 22 and the head with helment is placed within the canopy at the normal position and distance from the canopy of a pilot normally flying the F-16 aircraft. As birds are impacted on the canopy, which can result in an impact of the canopy with the helmeted dummy head, the triaxial accelerometers measure accelerations in a conventional manner. The horizontal load cell links measure force, aft and lateral forces. The vertical load cell links measure compression and tension forces. By knowing the distances $L_1$, $L_2$ and $L_3$, shown in FIG. 4, yawing moments, pitching moments and rolling moments at the base of the neck can be determined.

There is thus provided a head and neck impact measuring device which can be used to provide adequate biomedical assessment of the potential for head and neck injury to pilots due to impact from bird-aircraft midair collisions.

We claim:

1. A system for measuring head and neck impact forces in a simulated bird-aircraft collision test system, comprising: a movable support member; an anthropometric dummy head and neck member secured to said movable support member; a first fixed support member vertically spaced from said movable support member; a first force measuring load cell connected between the movable support member and said first fixed support member; said first load cell having an active axis passing vertically through the movable support member and the fixed support member a predetermined first distance on one side of the head and neck member; a second fixed support member; a second force measuring load cell connected between the movable support member and said second fixed support member; said second load cell having an active axis passing horizontally through the movable support member and the second fixed support member and intersecting the active axis of said first load cell at a first point of intersection within the movable support member; a third force measuring load cell connected between the movable support member and said first fixed support member; said third load cell having an active axis passing vertically through the movable support member and said first fixed support member a predetermined second distance equal to said first distance on the side of the head and neck member remote from said first point of intersection; a third fixed support member; a fourth force measuring load cell connected between the movable support member and said third fixed support member; said fourth load cell having an active axis passing horizontally through the movable support member and the third fixed support member and intersecting the active axis of said third load cell at a second point of intersection within the movable support member; a fifth force measuring load cell connected between said movable support member and said first fixed support member; said fifth load cell having an active axis passing vertically through the movable support member and said first fixed support member a predetermined third distance forward of said head and neck member; a fourth fixed support member; a sixth force measuring load cell connected between said movable support member and said fourth fixed support member; said sixth load cell having an active axis passing horizontally through the movable support member and the fourth fixed support member parallel to a line passing through the first and second points of intersection in said movable member and intersecting the active axis of said fifth load cell at a third point of intersection within the movable member.

2. The device as recited in claim 1 including a first triaxial accelerometer positioned at the center of gravity of the head and neck member; a second triaxial accelerometer positioned on said movable support member in vertical alignment with said first triaxial accelerometer.

* * * * *